July 3, 1962 G. ROLLAT 3,041,895
MACHINE-TOOL OR MEASURING MACHINE
Filed Dec. 8, 1958 2 Sheets-Sheet 1

INVENTOR
GERMAIN ROLLAT
BY Irwin S. Thompson
ATTY.

July 3, 1962 G. ROLLAT 3,041,895
MACHINE-TOOL OR MEASURING MACHINE

Filed Dec. 8, 1958 2 Sheets-Sheet 2

INVENTOR

GERMAIN ROLLAT

BY Irwin S. Thompson
ATTY.

# United States Patent Office 3,041,895
MACHINE-TOOL OR MEASURING MACHINE
Germain Rollat, Geneva, Switzerland, assignor to Societe Genevoise d'Instruments de Physique, Geneva, Switzerland, a corporation of Switzerland
Filed Dec. 8, 1958, Ser. No. 778,710
Claims priority, application Switzerland Dec. 30, 1957
6 Claims. (Cl. 77—4)

The present invention has for its object a machine-tool or a measuring machine comprising a movable member performing a rectilinear movement and equipped with a rotary member for the permanent control of the position of said movable member.

In the known machine-tools, such as the jig boring machines, equipped with a rotary member for controlling the rectilinear displacements of the table, said rotary member is connected with the table through a mechanical connection comprising generally a rack carried by the table and meshing with a pinion carried by the machine bed.

It follows that the angular displacements of the rotary member are strictly proportional to the rectilinear displacements of the table. However, such a mechanical connection is difficult to realize when the table must be able to perform large rectilinear displacements, as it is in the case of jig boring machines, for instance. Effectively, the accurate machining of a rack of small module and having a length of one metre and more presents great difficulties. Therefore, the manufacturers prefer generally to build up said rack by means of several butt-jointed portions. Furthermore, in order to allow a modification of the angular position of the rotary member with respect to the position occupied by the table, it is necessary to make the rack movable with respect to the table. It is clear that, in this case, the fastening device of the rack onto the table presents very great difficulties of realization, if one desires to secure with precision the position of said rack with respect to the table. Moreover, it is difficult to avoid a bending of the rack between its fastening points, now such a bending is necessarily the cause of transmission errors, the meshing between rack and pinion being not secured with all the desirable accuracy.

The machine-tool, object of the invention, tends to eliminate said drawbacks by the fact that said movable member is connected to the rotary control member through a mechanical connection comprising a screw disposed parallelly to the displacements of the movable member and meshing with a pinion rolling along said screw and driving the rotary member into angular displacements which are proportional to the linear displacements of the movable member and by the fact that it comprises an operating member mechanically connected to said rotary control member through an irreversible mechanical connection comprising said screw and said pinion and which drives said rotary member into angular displacements which are proportional to the angular displacements imparted to said operating member.

The accompanying drawing shows, schematically and by way of example, an embodiment of the machine-tool object of the invention.

Figure 1:
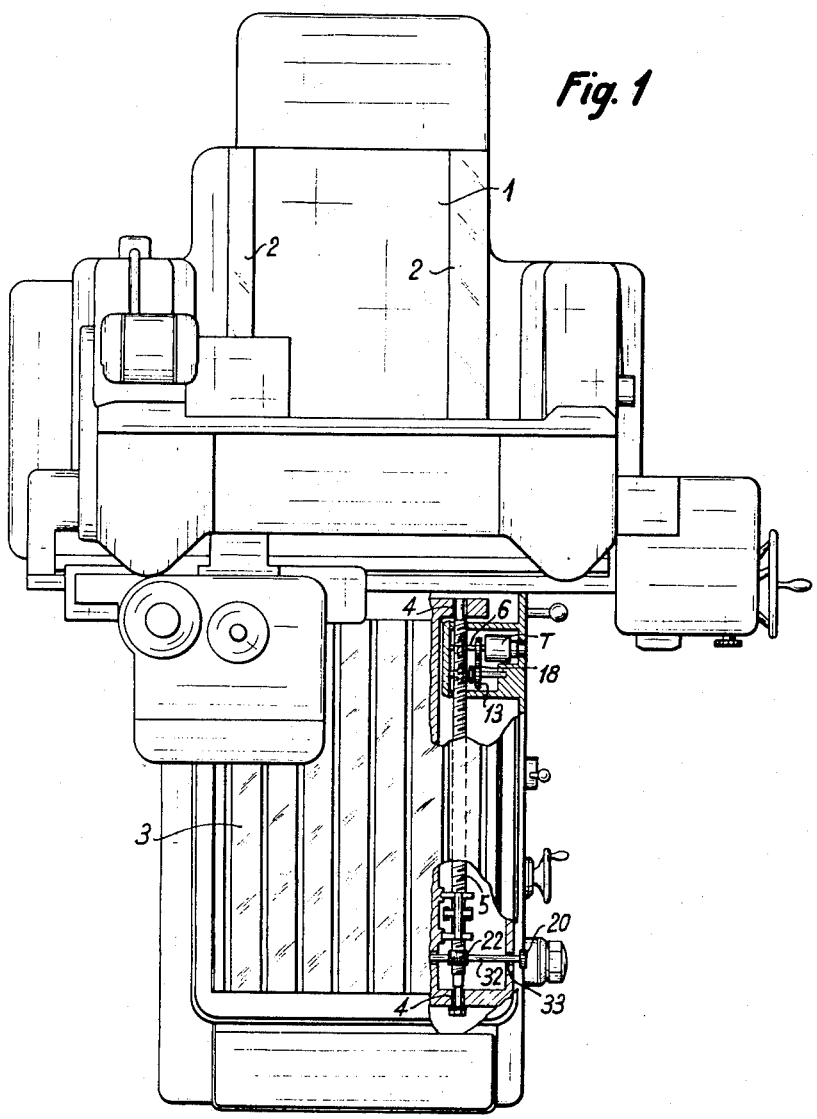
FIG. 1 is a top view of a jig boring machine, certain portions being torn away and other portions shown in cross-section.
Figure 2:
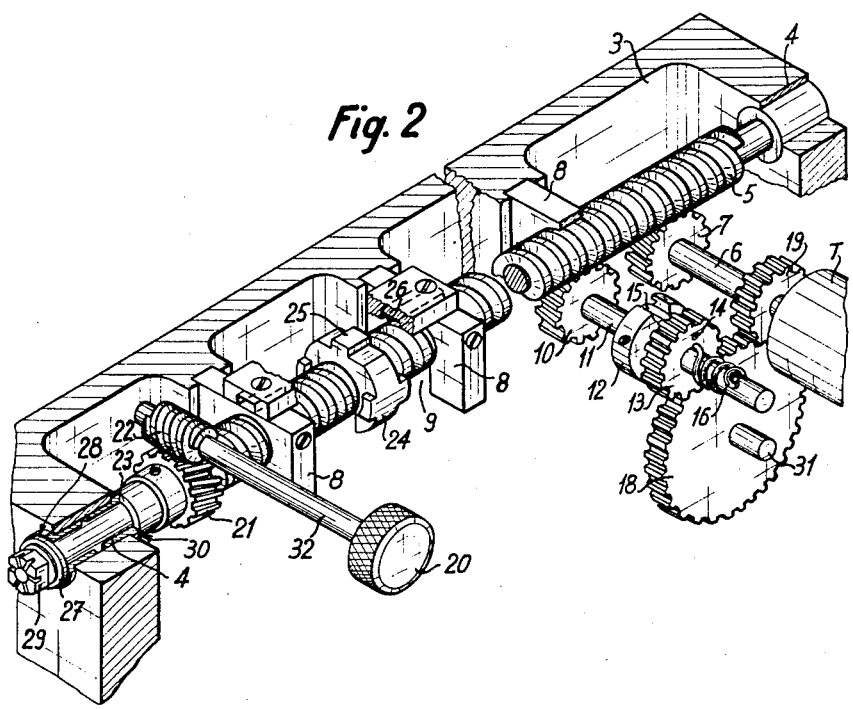
FIG. 2 is a perspective view at a greater scale of the mechanical connection connecting the table with the rotary control member.

According to the accompanying drawing, the jig boring machine comprises a bed 1 provided with guideways 2, along which a table 3 can be displaced. Bearings 4 secured into said table 3 carry a screw 5.

In the example shown, the jig boring machine is provided with a device for the permanent control of the position of the table 3 along its guideways 2 comprising an electrical angle transmitter T, constituted by a phase-shifter the stator of which is secured to the bed of the machine-tool, while its rotor is carried by a shaft 6 which constitutes a rotary control member and carries a pinion 7 meshing with the screw 5. The pitch of said screw is small enough to prevent any rotation of said screw under the action of the torque which has to be transmitted in order to drive the shaft 6 upon a displacement of the table 3 along its guideways. Consequently, upon a displacement of the table 3, the pinion 7 rotates on shaft 6 about a generatrix of the screw 5. Thus, said table 3 is connected with the shaft 6 through such a mechanical connection that said shaft is driven into angular displacements which are proportional to the displacements of the table 3.

In order to avoid a bending of the screw 5 between its bearings 4, intermediary supports 8 fastened to the table comprise each an opening 9 permitting the passage of the pinion 7, but enclose the screw 5 over more than 180°. The screw 5 rotates practically without play in the intermediary support 8 and in the bearings 4.

The machine shown is further provided with a device automatically suppressing any possible play between the pinion 7 and the threads of the screw 5. Said device comprises an auxiliary pinion 10, meshing with the screw 5 and fast with a shaft 11 carrying, on the one hand, a platen 12 rigidly fastened onto it and, on the other hand, a pinion 13. The pinion 13, angularly displaceable with respect to the shaft 11, carries a pin 14 engaged into a notch 15 provided in the platen 12. Said pin 14 and said notch 15 determine the amplitude of the highest permissible angular displacement between the pinion 13 and the shaft 11.

A gear wheel 18 meshes simultaneously with the pinion 13 and a pinion 19 fastened on the shaft 6. A spring 16 exerts on the pinion 13 a torque which is higher than the torque which the screw 5 must transmit to the pinion 7, so that the teeth of the pinions 7 and 10 are each maintained constantly applied against one and same face of the thread of the screw 5 whatever may be the direction of the displacements of the table 3. Thus the play between the screw 5 and the pinion 7 is automatically eliminated. The torque exerted by the spring 16 can be chosen greater than the torque which must be transmitted, in consideration that the pitch of the screw 5 is small enough to prevent any driving in rotation of the screw 5 by the pinion 7.

In order to secure an accurate position of the screw 5 with respect to the table 3, said screw is provided with a shoulder 23 maintained permanently in contact with the frontal face 30 of the bearing 4 by a spring washer 27 squeezed between the frontal face 28 of said same bearing and a nut 29 screwed onto the end 17 of the screw 5.

The machine shown is further provided with a resetting to zero device of the angular position of the shaft 6. Said device comprises an operating member 20, fast with a shaft 32 rotating in a bearing 33 provided in the table 3. The operating member 20 is mechanically connected with the rotary control member through an irreversible connection. Said connection comprises a worm 22 meshing with a worm-wheel 21 fastened on the screw 5 meshing with the pinion 7, connected to the rotary member 6.

An angular displacement of the operating member 20 provides, by the intermediary of the screw 5 and of the pinion 7, a modification of the angular position of the shaft 6 with respect to the position of the table 3 along its guideways.

A nut 24 is mounted on the screw 5 and comprises a nose 25 engaged into a guide 26. Upon operation of the member 20, said nut is displaced along the screw 5 and comes to stop against the one or the other of the supports 8, in order to limit the amplitude of the angular displacement of the shaft 6 operated by the member 20 to a value lower than 180° or 360°, according to the type of angle transmitter utilized.

From the foregoing and from the examination of the accompanying drawing, one can easily see that the described mechanical connection, connecting the table 3 with the shaft 6, permits to transmit accurately to said shaft all the displacements of the table, still effecting a resetting to zero of the angular position of said shaft. One skilled in the art knows, further, that the machining of a precision screw, even of great length, is an operation easier and more facile to realize than the precise machining of a rack. Moreover, the pinion 7 being driven in rotation, as well by an axial displacement of the screw 5 as by an angular displacement of said screw, the device for the resetting to zero of the shaft 6 does not present any more difficulty of realization.

An embodiment of the machine has been described hereby way of example and with reference to the accompanying drawing, but it goes without saying that multiple embodiments can be foreseen. Thus, for example, the shaft 6 can constitute a rotary member controlling the unities (millimetres) of the displacement of the table, and the shaft 31 carrying the gear wheel 18 could also carry the rotor of a second phase-shifter or electrical angles transmitter and constitute a rotary member controlling the tens (centimetres) of the displacement of the table 3.

It is clear that the device for the control of the position of the table could also be constituted by a position indicating apparatus with a dial and a hand, operated by the shafts 6 and 31.

What I claim is:

1. An indicating device for indicating the displacement of a support member of a machine comprising:
   a screw carried by said support member and parallel thereto,
   bearings rigidly fastened to said support member, said screw being journaled in said bearings,
   a pinion driven in rotation upon longitudinal linear motion as well as upon rotary motion of said screw,
   a synchronous transmitter of said indicating device having a rotary member driven by said pinion in angular displacement corresponding to the linear displacement of said support member,
   and mechanical means for setting said indicating device to zero including means for engaging and rotating said screw.

2. An indicating device as claimed in claim 1 and further comprising means for automatically eliminating the play existing between said pinion and said screw.

3. An indicating device as claimed in claim 2 in which said play-eliminating means comprises an auxiliary pinion meshing with said screw, spring means connecting said two pinions mechanically one with the other, whereby the torque of said spring means is greater than the torque which said screw shall transmit to said pinion.

4. An indicating device as claimed in claim 1 and further comprising at least one intermediate support in which revolves said screw, a longitudinal passage made in said support for the passage of said pinion, said support surrounding said screw over an angle greater than 180°.

5. An indicating device for indicating the displacement of a support member of a machine comprising a synchronous transmitter having a rotary member driven by a driving mechanism in angular displacement corresponding to the linear displacement of said support member, said driving mechanism comprising a screw carried in bearings rigidly mounted in said support member and said screw is disposed parallel to said support member, a pinion meshing with and rotated by said screw upon longitudinal linear motion as well as upon rotary motion thereof for driving said rotary member, means for automatically eliminating the play existing between said pinion and said screws and said driving mechanism further comprising mechanical means including means for engaging and rotating said screw for setting said indicating device to zero without modifying the position of said support member.

6. An indicating device for indicating the displacement of a support member of a machine comprising:
   a synchronous transmitter having a rotary member driven by a driving mechanism in angular displacement corresponding to the linear displacement of said support member,
   said driving mechanism comprising a screw carried by said support member and disposed parallel thereto,
   a pinion meshing with and rotated by said screw upon longitudinal linear motion as well as upon rotary motion thereof for driving said rotary member,
   and said driving mechanism further comprising mechanical control means for the angular position of said screw,
   said mechanical control means having an operating member, a worm driven by said operating member and a worm wheel meshing with said worm and being fastened rigidly to said screw,
   said worm and worm wheel defining an irreversible driving connection to maintain said screw in its angular position and said operating member enables said indicating device to be set to zero without modifying the position of said support member.

References Cited in the file of this patent

UNITED STATES PATENTS

| | | |
|---|---|---|
| 1,107,731 | Vold | Aug. 18, 1914 |
| 1,863,007 | Elkins | June 14, 1932 |
| 2,110,958 | Lindner | Mar. 15, 1938 |
| 2,196,231 | Ridgway | Apr. 9, 1940 |
| 2,235,898 | Niemeyer | Mar. 25, 1941 |
| 2,419,818 | Burton | Apr. 29, 1947 |

FOREIGN PATENTS

| | | |
|---|---|---|
| 295,163 | Switzerland | Feb. 16, 1954 |
| 518,820 | France | Jan. 10, 1921 |
| 867,716 | France | Aug. 25, 1941 |
| 1,073,701 | France | Mar. 24, 1954 |